June 16, 1959     J. WEBER     2,891,247
RADIO RECEIVING SYSTEM
Filed Oct. 16, 1950
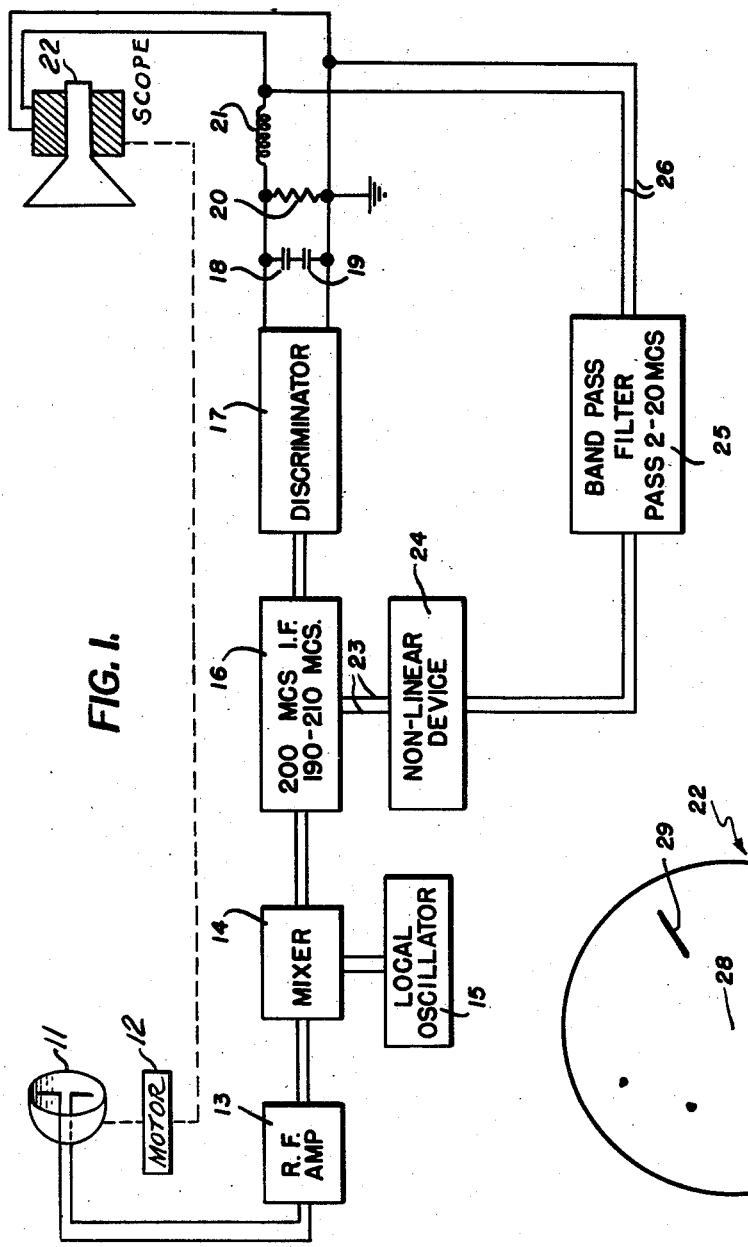
INVENTOR
JOSEPH WEBER
ATTORNEYS

United States Patent Office 2,891,247
Patented June 16, 1959

2,891,247

RADIO RECEIVING SYSTEM

Joseph Weber, Chevy Chase, Md.

Application October 16, 1950, Serial No. 190,431

3 Claims. (Cl. 343—113)

(Granted under Title 35, U.S. Code (1952), sec. 266)

The invention described herein may be manufactured and used by or for the Government of the United States for governmental purposes without the payment of any royalties thereon or therefor.

The present invention relates to a radio receiving system and more particularly to a system for determining the locations of radio stations and for giving an indication when there is more than one station at the same bearing.

In the past there have been many systems developed for determining the azimuthal bearing of a radio station, beacon, or the like, with respect to a receiving station, and such systems are commonly employed as direction finders and as aids to navigation, both on the sea and in the air. One of the well known methods used by these systems to locate a radio station consists of a directional antenna which is rotated continuously through an arc of 360°. When a signal is picked up by the antenna it is fed to a wide bandwidth receiver which has a discriminator circuit in its output so that the signal is converted to a D.C. voltage which is proportional to the frequency of the received signal. This D.C. voltage is then applied to a cathode ray tube having a radial sweep and whose trace is rotated in synchronism with the antenna, whereby the D.C. voltage acts to locate the radial position of a spot on the tube. Thus, since the cathode ray tube trace rotates with the antenna a plot is obtained, in polar coordinates, of frequency as radial distances measured from the center of the screen and azimuth as the angular displacement of the trace from a zero point.

These prior systems have, however, a very great and undesirable disadvantage in the fact that the systems cannot distinguish when there is more than one radio station located at the same bearing. If more than one signal is present on a certain bearing, the individual signals enter the receiver and discriminator. Then, since the output of the discriminator is a D.C. voltage, the voltages due to the individual signals add together whereby a spurious response results which is not a true indication of the frequency of any of the stations. Furthermore, from the indication on the cathode ray tube, the operator has no way of knowing whether the response shown is due to a single signal or more than one, and this greatly reduces the reliability of the system.

The present invention, on the other hand, represents a vast improvement over the old systems because it provides a method for warning the operator when more than one signal is present. It also represents a reliable and accurate radio receiving system for the location of unknown radio stations.

An object of the present invention is the provision of a method of improving the performance of a radio receiving system.

Another object is to provide a method and apparatus for warning the operator when there is more than one signal present on a given bearing.

Yet another object is the provision of a system for indicating the frequency and bearing of a radio station at a point remote from the station.

Still another object is the provision of a system for determining the azimuth of received signals and whether more than one signal exists on a given bearing.

Other objects and advantages of the invention will hereinafter become more fully apparent from the following description of the annexed drawings, which illustrate a preferred embodiment, and wherein:

Fig. 1 is a block diagram of the complete system;

Fig. 2 is an end view of the cathode ray tube showing the indication thereon when single and multiple signals are received.

Referring now to the drawings, wherein like reference characters designate like or corresponding parts throughout the several views, there is shown in Fig. 1 a block diagram of the complete system and it is to be noted that each of the blocks denotes an electronic component which is well known to everyone in the electronic art. As can be clearly seen in Fig. 1, there is a directional antenna 11 which is caused to continuously rotate by a motor 12, at a relatively high speed in the order of several hundred revolutions per minute. The output of antenna 11 feeds directly to a wide bandwidth receiver which is illustrated here as being a superheterodyne receiver but it is to be understood that the invention will operate equally well when other types are used. Antenna 11 is connected directly to an R.F. amplifier 13 from whence a signal is then fed to mixer 14 where it mixes with and beats against a signal from local oscillator 15 thereby to form an intermediate frequency. This intermediate frequency then passes through an I.F. amplifier 16 which has its output connected to a discriminator 17, the discriminator being so designed that it produces a D.C. voltage output which is proportional to the frequency of the signal fed to it. Connected directly across the output of discriminator 17 is a filter network consisting of series connected condensers 18 and 19 as well as resistance 20 and an R.F. choke 21. One lead of the output is attached to ground, as at one extremity of resistor 20.

The entire output of discriminator 17, aftter it passes through filter network 18, 19, 20 and 21, is applied to a cathode ray tube 22, which, it is to be noted, is operated as a plan position indicator, or P.P.I. For the sake of simplicity in the drawings the complete scope with its associated sweep circuits is not shown, but it will be recalled that a cathode ray tube operated as a P.P.I. has a radial sweep starting from the center of the tube and moving to the periphery, while the trace is meanwhile revolved around the tube by means of rotating magnetic coils, or the like.

While the output of I.F. amplifier 16 is primarily applied to discriminator 17 a portion of it is tapped off, by means of leads 23, and applied to a non-linear device 24, which may be in the form of a mixer and amplifier. The output of the non-linear device 24 is then made to pass through a band pass filter 25, after which it is applied by means of leads 26 to the scope 22.

In the illustration of Fig. 2, there can be clearly seen an end view of the scope 22 with indications of both single and multiple signals displayed thereon. The small dots, as 27, represent a single signal wherein the distance of the dot from the center 28 of the tube is indicative of the frequency of the signal, and its angular position is indicative of the bearing of the signal source. On the other hand the elongated dashes 29 act as a warning to the operator that more than one signal is present at the bearing indicated. The manner in which the dashes 29 are obtained will be more fully described hereinafter when the operation of the device is given.

In operation, the present invention is designed to improve the performance of radio receiving systems so that when they are being employed to locate and determine the bearing of a radio station, or other source of impulses, that the operator of the device can simply and quickly tell if more than one signal source is being received on the same bearing. These results are accomplished as follows. The antenna 11, which is of unidirectional design, is continuously rotated by motor 12 at the relatively high speed of several hundred revolutions per minute so that it repeatedly scans the area around its location. When a signal is received by the antenna, it is amplified by R.F. amplifier 13 and fed to the mixer 14 where it is beat against a signal from local oscillator 15 to generate an intermediate frequency. As pointed out hereinbefore, while other receivers will operate entirely satisfactorily in the present invention, for convenience sake a superheterodyne receiver is illustrated. A wide bandwidth superheterodyne receiver is employed and as such might have an I.F. amplifier of 200 mcs., 20 mcs. wide as is well known in the art. Thus, signals of a frequency from 190–210 mcs. are present in the I.F. bandwidth.

The I.F. frequency from the mixer 14 is then amplified by I.F. amplifier 16 and fed to a discriminator circuit 17 where a D.C. voltage is produced which is proportional to the frequency of the I.F. signal fed to the discriminator. After passing through the capacitor-resistor-choke filter combination 18, 19, 20 and 21, the D.C. voltage from discriminator 17 is applied to a scope 22. It will be recalled that scope 22 has a radial sweep, from the center of the tube outward, and that its trace is continuously related in synchronism with the rotation of antenna 11. Therefore, when the D.C. output of discriminator 17 is applied to the scope 22 a spot appears which is displaced from the center of the tube by a distance proportional to the magnitude of the D.C. voltage (and therefore the I.F. frequency.) Furthermore, the angular position of the scope trace as measured for the "12 o'clock" position, for example, at the time the spot appears, is an indication of the bearing of the signal source emitting the received impulse. If there is only one signal present in the bandwidth of 190–210 mcs., then it will appear as a single spot on the scope face, such as spots 27 in Fig. 2, and the bearings of the two signal sources would be approximately 170° and 240° respectively.

In the old systems, used heretofore, if there should be two signals on the same bearing, then two D.C. voltages would be produced by the discriminator 17, and these voltages would add together to give a single spurious indication on the scope. This is not possible, however, in the present device. A portion of the I.F. signal, after it has been amplified by element 16, is tapped off and fed to a non-linear device 24 by means of the leads 23. The component 24 may be any well known non-linear mixer and amplifier so that should two signals be present in the output of amplifier 16, then their difference frequency will appear at the output of 24. This difference frequency is then passed through a low bandpass filter 25, which is designed to have a bandspread of approximately 2–20 mcs. since the bandwidth of the I.F. amplifier is 20 mcs. The output of filter 25 is then applied to scope 22, by means of leads 26, and a short radial line, or dash, will appear on the bearing where the multiplicity of signals is present, such as dashes 29 at approximately 55° or 210° in Fig. 2. The appearance of a dash, rather than a dot, on the face of the scope should instantly put the operator on notice that more than one signal is being received at that particular bearing, and should it be desirous to separate these signals, then a filter can be used to tune over the I.F. bandwidth and pick out the individual signals.

It should be readily apparent from observing the drawings, how the radial line or dash is obtained. As has been described hereinbefore, even though two signals may be received simultaneously, the discriminator will produce only a single D.C. voltage for application to the scope. However, the tapped-off signal, through the action of the non-linear device 24, is a varying A.C. voltage which is also applied to the scope and superimposed upon the D.C. voltage. The result is a varying or vibrating voltage which swings between the limits of sum and difference of the A.C. and D.C. voltages and this gives the appearance of a short radial line on the scope.

From the above description of the structure and operation of the present device, it is obvious that the invention presents a new and novel method and apparatus for improving the operation of radio receiving systems whereby the operator of the system is instantly and accurately warned when more than one signal source appears to be located on the same azimuthal bearing. The device likewise presents a means for indicating both the frequency and the bearing of the signal source.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. In a signal receiving system for determining whether a plurality of signals are being received on the same bearing, an antenna, means for rotating the antenna, a receiver connected to said antenna, means for applying a portion of the receiver output to a discriminator, means for tapping off a portion of said receiver output and combining the frequencies therein if more than one is present to form another frequency, a cathode ray indicator, and means for applying the discriminator output and said other frequency to the indicator whereby the indication due to the discriminator output is caused to oscillate by said other frequency to thereby indicate that a plurality of signals are being received by the antenna.

2. In a radio locator for showing the presence of more than one station on the same bearing, an antenna, means for rotating the antenna, a receiver connected to said antenna, means utilizing the output of said receiver to produce a direct current voltage, means also utilizing a portion of the receiver output to produce an intermediate frequency between those frequencies in said receiver output should more than one be present, a cathode ray tube indicator, and means for applying said direct current voltage and said intermediate frequency to the indicator whereby the direct current indication is caused to oscillate by the intermediate frequency.

3. In a signal receiving system, an antenna, means for rotating the antenna, a receiver connected to said antenna, means utilizing a portion of the receiver output to produce a direct current voltage, means utilizing another portion to produce an alternating current voltage, an indicator rotated in synchronism with said antenna and means for applying both voltages to the indicator, whereby the alternating current is superimposed upon the direct current voltage.

References Cited in the file of this patent

UNITED STATES PATENTS

| | | |
|---|---|---|
| 2,279,246 | Podliasky, et al. | Apr. 7, 1942 |
| 2,378,604 | Wallace | June 19, 1945 |
| 2,406,858 | Shepherd et al. | Sept. 3, 1946 |
| 2,408,040 | Busignies | Sept. 24, 1946 |
| 2,427,905 | Fyler | Sept. 23, 1947 |
| 2,475,612 | Hansel | July 12, 1949 |
| 2,516,389 | Hurvitz | July 25, 1950 |